UNITED STATES PATENT OFFICE.

WILLIAM SILVER, JR., OF WAPWALLOPEN, PENNSYLVANIA.

IMPROVEMENT IN BLASTING-POWDER.

Specification forming part of Letters Patent No. 15,257, dated July 1, 1856.

*To all whom it may concern:*

Be it known that I, WILLIAM SILVER, Jr., of Wapwallopen, in the county of Luzerne and State of Pennsylvania, have invented a new Explosive Compound for Blasting Purposes; and I do hereby declare that the following is a full, clear, and exact description of the component parts of and the manner of compounding and treating the same.

The object of this invention is to produce at a low price a compound that is cheaper than common blasting-powder and possesses greater explosive force.

This compound is composed of gunpowder, chlorate of potassa, finely-pulverized calcined or burned cork and paper, or cotton or linen rags. The gunpowder which I employ is composed of seventy-two per cent., by weight, saltpeter, twelve per cent. sulphur, and sixteen per cent. wood-charcoal.

To prepare the compound, I first take the gunpowder, chlorate of potassa, and calcined or burned cork, in the following proportions by weight: Gunpowder, ten parts; chlorate of potassa, five and a half parts; calcined or burned cork, two parts. In a suitable vessel I mix one pound of the above substances in the above-specified proportions with about three pints of water, first placing in the vessel the water, then adding the gunpowder, and stirring till the latter is as far as possible dissolved, afterward adding the chlorate of potassa and stirring till that is dissolved, and finally adding the calcined or burned cork and stirring the whole well together. I then put into the mixture about three pounds of paper, or cotton or linen rags, which is about sufficient to absorb all the fluid portion and retain all the insoluble matter on its surface. I next evaporate in any convenient manner by exposure to the air the whole of the water, and the compound is then fit for use.

The manner in which I propose to use the compound is to pack it moderately tight into cartridges of paper or thin sheet metal of suitable sizes for blasts.

In this compound chlorate of potassa supplies oxygen to combine with the carbon set free by the explosion, and thus to produce a more perfect decomposition and obtain greater expansive force. The calcined cork serves to make the gunpowder and chlorate of potassa adhere better to the rags or paper, and also supplies additional carbon, and is preferable to carbon from any other material on account of the readiness with which it ignites and the rapidity with which its smoke evaporates. The rags or paper serve to keep the other and more combustible portions of the compound loose and light, so that the whole charge may be ignited throughout instantaneously, which gives the greatest force to the explosion. The compound may be made without difficulty by mixing the ingredients in any vessel. The gunpowder that is employed in the compound does not require to be granulated, and therefore its cost is not great, as the cost of granulating powder is greater than that of all other parts of the manufacture.

This compound can be produced at a less price in proportion to its explosive power than common blasting-powder, and it possesses the advantage over common blasting-powder of exploding with very little smoke, owing to the perfect combustion of its parts.

What I claim as my invention, and desire by Letters Patent, is—

The explosive compound herein described, consisting of rags or paper saturated and coated with a mixture of gunpower, chlorate of potassa, and powdered calcined cork in about the proportions set forth.

WILLIAM SILVER, JR.

Witnesses:
D. G. DRIESBACH,
J. R. ANDERSON.